United States Patent [19]

Uchida

[11] 4,390,129
[45] Jun. 28, 1983

[54] DOUBLE-INJECTION TYPE FUEL INJECTION VALVE

[75] Inventor: Kazuo Uchida, Matsuyama, Japan

[73] Assignee: Diesel Kiki Co., Ltd., Tokyo, Japan

[21] Appl. No.: 379,461

[22] Filed: May 18, 1982

[30] Foreign Application Priority Data

May 25, 1981 [JP] Japan .............................. 56-75337[U]

[51] Int. Cl.³ ................................................ F02M 45/08
[52] U.S. Cl. .............................. 239/533.5; 239/533.9
[58] Field of Search .................... 239/533.2–533.11, 239/584

[56] References Cited

U.S. PATENT DOCUMENTS 1,735,718 11/1929 Attendu .......................... 239/533.6
2,921,746 1/1960 Burman ............................. 239/584
4,359,191 11/1982 Uchida ........................... 239/533.5

Primary Examiner—Andres Kashnikow
Assistant Examiner—Jon M. Rastello

Attorney, Agent, or Firm—Frishauf, Holtz, Goodman & Woodward

[57] ABSTRACT

A fuel injection valve which is adapted to carry out fuel injection in a double-step manner such that lifting of the nozzle needle through the initial injection stroke causes contraction of a first nozzle spring and subsequent lifting of the nozzle needle through the main injection stroke causes contraction of a second nozzle spring as well as the first nozzle spring. A spacer is removably fitted in an end face of the nozzle holder remote from the nozzle and has its inner end face urgingly engaging the first nozzle spring supported by a first movable spring seat, with a setting load adjusting shim interposed between the spacer and the first nozzle spring. The spacer is retained in place by a hollow threaded member screwed in the nozzle holder. A second movable spring seat supporting the second nozzle spring in the hollow threaded member is partly fitted through the spacer and faces the first movable spring seat with an initial injection lift gap provided therebetween, which can be adjusted by a shim interposed between the spacer and the second movable spring seat.

4 Claims, 4 Drawing Figures

FIG. 1
FIG. 2
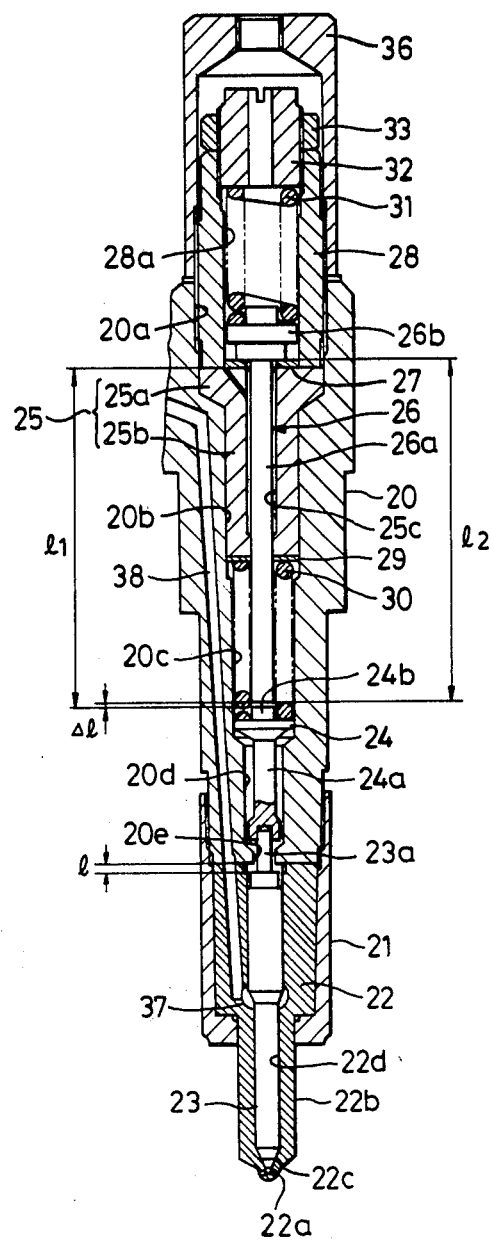
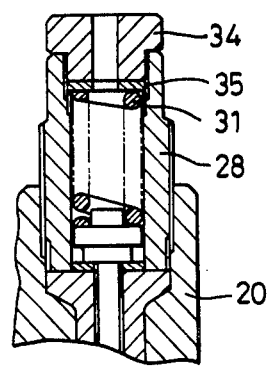

FIG. 3
FIG. 4
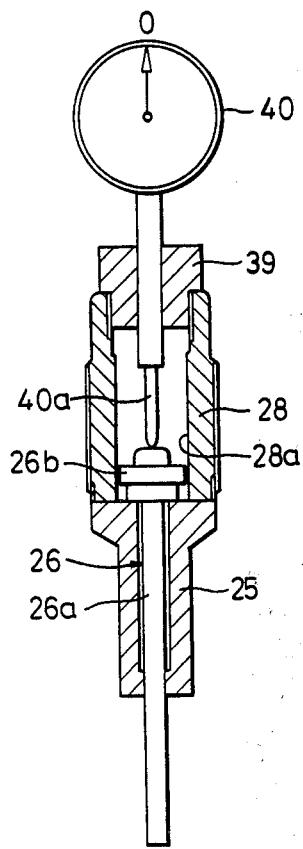
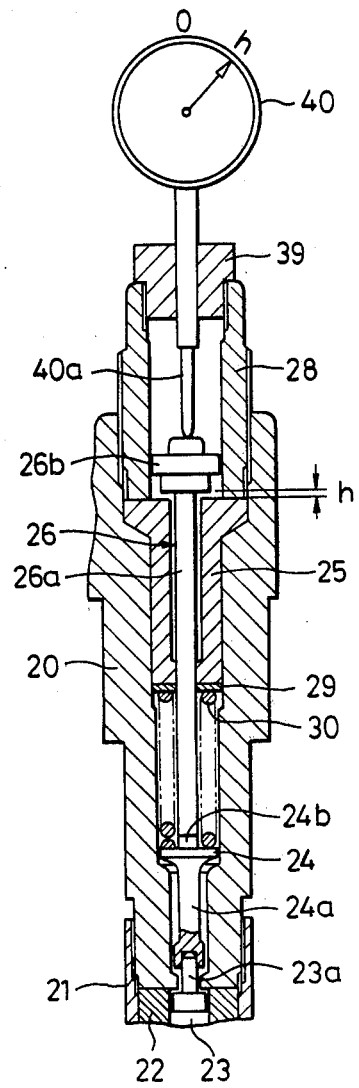

DOUBLE-INJECTION TYPE FUEL INJECTION VALVE

BACKGROUND OF THE INVENTION

This invention relates to a fuel injection valve for use in a direct-injection type internal combustion engine.

In a conventional diesel engine, there is a problem that while the fuel injection rate, i.e. injection quantity per unit time should be set at a suitably high value for improvement of the output characteristics of the engine as well as prevention of the emission of nitrous oxides, an increased fuel injection rate can lead to a correspondingly shortened injection period, which causes a reduction in the combustion duration, resulting in a combustion noise, and can also cause an increase in maximum pressure within the engine cylinders.

On the other hand, in conventional fuel injection valves using multihole nozzles for conventional diesel engines, the valve operation is monotonously affected by pressure changes within the injection pipe connecting between the valve and the fuel injection pump, that is, a specific amount of increase in the pressure within the injection pipe causes the same amount of increase in the lift of the nozzle needle in a lower injection quantity region as in a higher injection quantity region. As a consequence, in the lower injection quantity region, the nozzle needle can lift through an excessive stroke to provide an excessive injection quantity due to the increase of the pressure within the injection pipe, and the resulting pressure drop in the injection pipe causes too small an injection quantity during the next injection stroke, followed by an excessive injection quantity during the further next injection stroke. In this manner, the conventional fuel injection valves suffer unstable or irregular fuel injection. Although conventional fuel injection valves using pintle nozzles can overcome the above phenomenon of unstable or irregular injection by virtue of the arrangement that the nozzle needle has its tip slidably fitted in the injection hole in the nozzle body to produce a throttling effect, those using multihole nozzles are unable to avoid the above phenomenon.

To solve the above problem, a fuel injection valve has been proposed by the assignee of the present application in U.S. Ser. No. 237,941 filed Feb. 25, 1981 for instance, which includes a second nozzle spring arranged in the nozzle holder in addition to a conventionally employed first nozzle spring. In this proposed fuel injection valve, fuel injection takes place in two steps, i.e. an initial injection and a main injection, in such a manner that during the initial injection the nozzle needle is lifted through a limited stroke against the force of the first nozzle spring, and the main injection subsequently takes place with the valve opening pressure determined by the combined force of the first and second nozzle springs. This double-step injection reduces the injection rate throughout the whole injection period, thus substantially overcoming all the aforementioned drawbacks of combustion noise, emission of nitrous oxides and irregular injection.

According to the above proposed fuel injection valve, during the initial injection lifting of the nozzle needle causes corresponding lifting of a first movable spring seat which supports the first nozzle spring, to cause contraction of the same spring to execute an initial injection lift, and during the subsequent main injection the first movable spring seat is further lifted to urgingly displace a rod-like second movable spring seat which supports the second nozzle spring, to cause contraction of the same spring to execute a main injection lift. Further in the above fuel injection valve, the valve opening pressure for initial injection is determined by the setting load of the first nozzle spring, and the valve opening pressure for main injection by the sum of the setting loads of the first nozzle spring and the second nozzle spring, respectively.

However, according to this injection valve, adjustment of the setting load of the first nozzle spring is carried out by selecting the thickness of a shim interposed between the same spring and its seating surface formed in the nozzle holder, which requires dismantling the injection nozzle portion of the valve for each adjustment of the initial injection valve opening pressure and the main injection valve opening pressure. This makes the adjusting operation complicated. In addition, during the dismantling operation, dust can be intruded and caught in gaps between the nozzle holder and the nozzle body, causing leakage of fuel, clogging of the injection holes, etc. Further, to adjust the initial injection lift, an adjusting threaded member, which is threadedly fitted in the nozzle holder, is rotated to axially displace the second movable spring seat engaging therewith to vary the gap between the first movable spring seat and the second movable spring seat. However, like ordinary threaded parts, machining tolerances exist between the screw threads formed on the outer peripheral surface of the above adjusting threaded member, the associated inner peripheral surface of the nozzle holder and the inner peripheral surface of a lock nut threadedly fitted on the adjusting threaded member, which can result in play of the adjusting threaded member relative to the nozzle holder. Also, due to the machining tolerances, the line which connects between a crest of each screw thread and a root diametrically corresponding to the crest and crosses with the axis of the screw thread is not normal to the axis of the screw thread. As a consequence, when the adjusting threaded member is fastened by the lock nut, it can get dislocated from its adjusted position. On the other hand, the initial injection lift value of a fuel injection valve of this kind is very small, i.e. on the order of 0.1 mm. Therefore, it is very difficult to set the initial injection lift gap to a desired value with accuracy.

Furthermore, fuel within the injection valve can leak through the lock nut along its upper and lower surfaces. Further tightening of the lock nut for prevention of the fuel leak can cause a further dislocation of the adjusting threaded member from its adjusted position due to the above machining tolerances, distortion of the screw thread, etc.

OBJECTS AND SUMMARY OF THE INVENTION

It is an object of the invention to provide a double-injection type fuel injection valve which permits accurate adjustment of the setting load of the first nozzle spring without dismantling the injection nozzle portion, thereby enabling accurate setting of the valve opening pressure for initial injection and one for main injection in a prompt manner.

It is a further object of the invention to provide a double-injection type fuel injection valve which permits adjustment of the lift of the nozzle needle for initial injection without rotating a threaded member, thereby enabling accurate setting of the initial injection lift without being affected by the machining tolerances of the screw threads.

The double-injection type fuel injection valve according to the present invention includes a spacer which is removably fitted in a bore formed in an end face of the nozzle holder remote from the injection nozzle. The spacer has its inner end face urgingly engaging the first nozzle spring to impart urging force to the first movable spring seat. A hollow threaded member having an internal space is removably threadedly fitted in the nozzle holder at a location outward of said spacer and disposed in tight contact with the spacer to retain same in place. The second movable spring seat has an enlarged portion arranged within the internal space of the hollow threaded member in facing relation to an outer end face of the spacer and a rod portion extending integrally from the enlarged portion and slidably fitted through an axial through bore formed in the spacer. The second nozzle spring is arranged within the internal space of the hollow threaded member in a manner urging the second movable spring seat toward the first movable spring seat. A first shim is interposed between the spacer and the first nozzle spring for adjusting the setting load of the first nozzle spring. A second shim is interposed between the enlarged portion of the second movable spring seat and the spacer for adjusting the initial injection lift gap between the first movable spring seat and the second movable spring seat.

The above and other objects, features and advantages of the invention will be more apparent from the ensuing detailed description taken in connection with the accompanying drawings in which:

BRIEF DESCRIPTION OF THE DRAWINGS

FIG. 1 is a longitudinal sectional view of a double-injection type fuel injection valve according to an embodiment of the present invention;

FIG. 2 is a longitudinal sectional fragmentary view of a modification of means for adjusting the setting load of the second nozzle spring, according to the invention;

FIG. 3 is a view showing a manner of mounting a measuring instrument in the hollow threaded member for adjusting the initial injection lift, according to the invention; and FIG. 4 is a view similar to FIG. 3, in which the measuring instrument and the threaded member are mounted in the nozzle holder.

DETAILED DESCRIPTION

The double-injection type fuel injection valve according to the present invention will now be described in detail with reference to the drawings.

A nozzle body 22 is rigidly mounted on an end of a nozzle holder 20 by means of a nozzle nut 21. The nozzle body 22 has its tip formed integrally with an injection nozzle 22b which has its tip formed with a plurality of injection holes 22a. The nozzle body 22 has an internal bore 22d in which a nozzle needle 23 is slidably fitted, with its tip seated on a valve seating surface 22c. The nozzle needle 23 has its rear end formed with a journal 23a. The nozzle holder 20 has five axial bores 20a, 20b, 20c, 20d and 20e axially continuously formed therein, which are gradually smaller in diameter toward the tip of the nozzle holder 20. The above journal 23a of the nozzle needle 23 is inserted in the second foremost axial bore 20d and supported by the tip of a push rod 24a of a first movable spring seat 24, which rod is slidably fitted in the above axial bore 20d. The movable spring seat 24 has an end remote from the nozzle needle 23 formed integrally with an axial protuberance 24b and an enlarged spring seating portion 24c which are located within the axial bore 20c.

A spacer 25, which has an axially stepped configuration, is fitted in the rearmost axial bore 20a and the second rearmost axial bore 20b, with its enlarged flange 25a fitted in the bore 20a and its narrowed trunk portion 25b in the bore 20b, respectively, in a manner that the spacer 25 can be rearwardly removed from the nozzle holder 20. Slidably fitted in an axial bore 25c formed through the spacer 25 is a push rod 26a integrally forming part of a second movable spring seat 26. The second movable spring seat 26 has an enlarged spring seating portion 26b engaged by the rear end surface of the spacer 25 via an initial injection lift adjusting shim 27 having a predetermined thickness as hereinlater described, interposed between the spacer and the enlarged spring seating portion 26b. The length of the push rod 26a of the second movable spring seat 26 is set at a value slightly larger than the distance $l_1$ between the level of the rear end surface of the spacer 25 and the rear end face of the axial protuberance 24b of the first movable spring seat 24, which is assumed when the seat 24 is in its seated position. The spacer 25 is retained in place with its rear end surface urged by a hollow threaded member 28 which is threadedly fitted in a tapped portion of the rearmost axial bore 20a of the nozzle holder 20, while it has its front end surface supporting a first nozzle spring 30 at its one end, received within the bore 20c of the nozzle holder 20, via a shim 29 for adjusting the setting load of the first nozzle spring 30, so as to impart urging force to the first nozzle spring seat 24. On the other hand, the enlarged spring seating portion 26b of the second movable spring seat 26 is located within an internal space 28a formed in the hollow threaded member 28 and urged by a second nozzle spring 31 received within the internal space 28a, against the spacer 25. The second nozzle spring 31 has its setting load adjustable by means of an adjusting screw 32 threadedly fitted in a rear tapped portion of the internal space of the threaded member 28. The adjusting screw 32 can be retained in place by tightening a lock nut 33 threadedly fitted thereon. Alternatively of the setting load adjusting means for the second nozzle spring in FIG. 1, as shown in FIG. 3 a cap screw 34 may be fitted in the above rear tapped portion of the internal space 28a of the threaded member 28, with a shim 35 interposed between the cap screw 34 and the second nozzle spring 31 to adjust the setting load of the latter.

Incidentally, a cap nut 36 is threadedly fitted on the rear end portion of the threaded member 28. A fuel passageway 38 is formed in the nozzle holder 20 and the nozzle body 22, which continuously extends in the peripheral walls of the two members for guiding fuel supplied from an associated fuel injection pump, not shown, into a pressure chamber 37 formed within the nozzle body 22.

With the above arrangement, fuel is fed under pressure by the fuel injection pump into the pressure chamber 37 of the nozzle body 22. When the fuel pressure in the pressure chamber 37 exceeds an initial injection valve opening pressure set by the first nozzle spring 30, the nozzle needle starts to be lifted. When the nozzle needle 23 is lifted through the initial injection lift $\Delta l$, the axial protuberance 24b of the first movable spring seat 24 collides with the front end of the push rod 26a of the second movable spring seat 26. On this occasion, so long as the fuel pressure does not increase beyond the sum of the setting load of the second nozzle spring 31 and the urging force of the first nozzle spring 30 which is then slightly compressed by an amount corresponding to the initial injection lift Δl executed, the second movable spring seat 26 is not lifted. When the fuel pressure exceeds the combined force of the first and second nozzle springs, the nozzle needle 23 is lifted, pushing the second movable spring seat 26 via the first movable spring seat 24, to cause contraction of the second nozzle spring 31, thus completing the maximum lift l.

By virtue of the above-described lifting characteristic of the nozzle needle 23, when the nozzle needle 23 is lifted through the lift Δl for initial injection, the injection rate is kept at a low value due to a small opening gap between the nozzle needle 23 and the nozzle needle seat 22c, while during the main injection following the initial injection, the above opening gap is sufficiently large to obtain a high injection rate.

The manner of adjusting the fuel injection valve according to the invention will now be described. First, setting of the initial injection valve opening pressure is effected by selecting the thickness of the adjusting shim 29 interposed between the front end face of the spacer 25 and the rear end of the first nozzle spring 30 so as to set the setting load of the first nozzle spring 30 to a value corresponding to a desired valve opening pressure for initial injection. Since the spacer 25 can be rearwardly removed, the setting load adjustment can be made without removing the nozzle body 22 from the nozzle holder 20, as distinct from a conventional fuel injection valve of this kind.

Setting of the initial injection lift Δl is effected in a manner shown in FIG. 3. The threaded member 28 and the spacer 25 are removed from the nozzle holder 20, and then the push rod 26a of the second movable spring seat 26 is inserted through the axial bore 25c of the spacer 25. The front end surface of the threaded member 28 is brought into contact with the upper end surface of the spacer 25 with the front end surface of the enlarged spring seating portion 26b disposed in contact with the rear end surface of the spacer 25. Then, a dial gauge 40 is mounted onto the threaded member 28 by means of a threaded mounting piece 39 threadedly fitted in the rear tapped portion of the internal space 28a of the threaded member 28, through which a rod portion of the dial gauge 40 extends. A probe 40a formed on the rod portion of the dial gauge 40 is brought into contact with the rear end surface of the enlarged spring seating portion 26b. With the probe 40a in this position, the pointer of the dial gauge 40 is set to zero in the scale. With the dial gauge 40 thus set in the illustrated position, the spacer 25 and the threaded member 28 are mounted onto the nozzle holder 20 as shown in FIG. 4, and then the push rod 26a of the second movable spring seat 26 comes into contact with the rear end surface of the axial protuberance 24b of the first movable spring seat 24 and then the enlarged spring seating portion 26b becomes slightly spaced from the rear end surface of the spacer 25, since the length of the push rod 26a of the second movable spring seat 26 is designed a little larger than the distance $l_1$ between the level of the rear end surface of the spacer and the level of the rear end surface of the axial protuberance 24b of the first movable spring seat 24, obtained when the spring seat 24 is in its seated position. At this time, a value h in the scale of the dial gauge 40 pointed by the pointer is read. This value h is equal to the difference between the above distance $l_1$ and the length $l_2$ of the push rod 26a. Therefore, to set the initial injection lift to a desired value Δl, a shim 27 which has a thickness equal to the sum of the read value h + the desired lift value Δl is inserted between the front end surface of the enlarged spring seating portion 26b of the second movable spring seat 26 and the rear end surface of the spacer 25.

The manner of adjusting the main injection valve opening pressure is as follows: The fuel injection valve is assembled without inserting the adjusting shim 27 having its thickness adjusted as above. In this assembled valve, the axial protuberance 24b of the first movable spring seat 24 is disposed in urging contact with the push rod 26a of the second movable spring seat 26. In this state, the adjusting screw 32 is rotated or the thickness of the adjusting shim 35 interposed between the second nozzle spring 31 and the cap screw 34 is selected to adjust the setting load of the second nozzle spring 30 so that the sum of the setting load of the first nozzle spring 30, which has already been adjusted as previously noted, and that of the second nozzle spring 31 becomes equal to a desired main injection valve opening pressure.

From the foregoing description and the drawings, it will be understood that the present invention can produce the following excellent results: Setting of the initial injection valve opening pressure can be made with ease and accuracy, merely by selecting the thickness of the first nozzle spring adjusting shim and inserting the shim thus selected between the spacer and the first nozzle spring. The arrangement of the spacer in a removable manner makes it unnecessary to remove the nozzle body from the nozzle holder, avoiding the trouble that dust or the like is caught between the two members to cause leakage of fuel to the outside and clogging of the injection holes, etc. Setting of the initial injection lift Δl can be made with ease and accuracy by selecting a shim having a thickness equal to the sum h + Δl interposed between the second movable spring seat and the spacer, the value h or the difference between the length $l_2$ of the push rod of the second movable spring seat and the distance $l_1$ between the rear end surface of the spacer and the rear end surface of the first movable spring seat in a seated position being easily measurable in the aforedescribed manner. Particularly, by virtue of the arrangement that the threaded member is in threaded engagement with the nozzle holder to urgingly hold the spacer in place, angular dislocation or distortion of the thread caused by excessive tightening and loosening of the threaded member does not affect the adjusted initial injection lift gap. Further, the frictional engagement of the threaded member and the spacer obtained by the threaded engagement of the former with the nozzle holder dispenses with the use of a lock nut for retaining the threaded member in place, thus avoiding leakage of fuel through the gap between the lock nut and the threaded member and also avoiding deviation from the adjusted initial injection lift gap which would be caused by finish tightening the lock nut. Furthermore, the arrangement that the first movable spring seat can be brought into urging contact with the second movable spring seat merely by removing the initial injection lift adjusting shim facilitates setting the main injection valve opening pressure which is obtained as the sum of the setting loads of the first and second nozzle springs.

While the invention has been particularly shown and described with reference to a preferred embodiment thereof, it will be understood by those skilled in the art that any changes and variations can be made therein without departing from the spirit and scope of the invention.

What is claimed is:

1. A fuel injection valve comprising: an injection nozzle having a nozzle needle liftable in response to fuel pressure; a nozzle holder supporting said injeciton nozzle; a first nozzle spring and a second nozzle spring arranged within said nozzle holder; a first movable spring seat supporting said first nozzle spring; a second movable spring seat supporting said second nozzle spring, said second movable spring seat having one end disposed in facing relation to said first movable spring seat and adapted to have said one end spaced from the latter by a predetermined gap when said nozzle needle is in a seated position thereof; whereby lifting of said nozzle needle from said seated position thereof causes a corresponding lifting of said first movable spring seat against the force of said first spring through a lift determined by said predetermined gap to effect an initial injection, and further lifting of said nozzle needle causes said first movable spring seat to urgingly displace said second movable spring seat against the combined force of said first and second springs to lift said second movable spring seat to effect a main injection; a spacer removably fitted in a bore formed in an end face of said nozzle holder remote from said injection nozzle, said spacer having an inner end face urgingly engaging said first nozzle spring to impart urging force to said first movable spring seat; a hollow threaded member having an internal space and removably threadedly fitted in said nozzle holder at a location outward of said spacer and disposed in tight contact with said spacer to retain same in place; said second movable spring seat having an enlarged portion arranged within said internal space of said hollow threaded member in facing relation to an outer end face of said spacer and a rod portion extending integrally from said enlarged portion and slidably fitted through an axial through bore formed in said spacer; said second nozzle spring being arranged within said internal space of said hollow threaded member and urging said second movable spring seat toward said first movable spring seat; a first shim interposed between said spacer and said first nozzle spring for adjusting the setting load of said first nozzle spring; and a second shim interposed between said enlarged portion of said second movable spring seat and said spacer for adjusting said predetermined gap for initial injection lift between said first movable spring seat and said second movable spring seat.

2. The fuel injection valve as claimed in claim 1, wherein said bore formed in said end face of said nozzle holder remote from said injection nozzle comprises a plurality of axial bores axially continuously formed and gradually decreasing in diameter toward said injection nozzle, said spacer having an axially stepped configuration gradually decreasing in diameter toward said injection nozzle, the configuration and diameter thereof corresponding to the configurations and diameters of said axial bores.

3. The fuel injection valve as claimed in claim 1 or claim 2, including a screw member threadedly fitted in said internal space of said hollow threaded member for adjusting the setting load of said second nozzle spring through rotative displacement thereof.

4. The fuel injection valve as claimed in claim 1 or claim 2, including a third shim arranged at one end of said second nozzle spring for adjusting the setting load thereof.

* * * * *